Oct. 16, 1956  S. B. WELCH  2,767,296
CONTROL SYSTEM FOR SURFACE HEATING UNITS
Filed Sept. 25, 1953  3 Sheets-Sheet 1

INVENTOR.
STANLEY B. WELCH
BY
HIS ATTORNEY

Oct. 16, 1956 — S. B. WELCH — 2,767,296
CONTROL SYSTEM FOR SURFACE HEATING UNITS
Filed Sept. 25, 1953 — 3 Sheets-Sheet 2

INVENTOR.
STANLEY B. WELCH
BY
HIS ATTORNEY

Oct. 16, 1956  S. B. WELCH  2,767,296
CONTROL SYSTEM FOR SURFACE HEATING UNITS
Filed Sept. 25, 1953  3 Sheets-Sheet 3

INVENTOR.
STANLEY B. WELCH
BY
HIS ATTORNEY

United States Patent Office 2,767,296
Patented Oct. 16, 1956

2,767,296

CONTROL SYSTEM FOR SURFACE HEATING UNITS

Stanley B. Welch, Louisville, Ky., assignor to General Electric Company, a corporation of New York Application September 25, 1953, Serial No. 382,423

15 Claims. (Cl. 219—20)

This invention relates to automatically controlled heating devices, and more particularly to automatic temperature control systems for surface heating units of the type employed in cooking operations.

In the process of cooking on surface heating units it is often necessary to adjust the heat output of the unit several times to heat the cooking utensil to the desired cooking temperature in the shortest possible time and then to maintain that temperature until the cooking process is completed. Thus, a person using an electric range frequently turns a heating unit on to the highest available rate of heating to bring the cooking utensil up to the desired temperature after which a lower rate of heating is selected to maintain the proper temperature. However, manual control in this manner is frequently unsatisfactory for several reasons. First, in some cooking operations such as griddling or frying in deep fat it is difficult to determine when the cooking utensil and its contents have been heated to the proper temperature; second, maintaining a constant temperature in the utensil often requires frequent adjustments of the heat output of the heating unit; and third, to avoid overheating the change from the highest heat output to a lower heat output must be made before the desired temperature is reached if the thermal mass of the cooking load is relatively low, while on the other hand the cooking of loads having a relatively high thermal mass may be unnecessarily delayed if the change is not delayed until some time after the utensil has reached the desired cooking temperature. In other words, to achieve optimum performance in a cooking operation, it is not only necessary to quickly heat the cooking load to the desired temperature and then reduce heat input to maintain that temperature, but also it is necessary to advance or delay the change from high to low heat in accordance with the thermal mass charcteristics of the utensil and its contents.

Accordingly a primary object of my invention is to provide an automatically controlled surface heating unit arranged to bring any cooking utensil quickly up to a preselected temperature and thereafter maintain that temperature within narrow limits.

Another object of my invention is to provide an automatic temperature control system for electric heating units which controls the heat output of the unit in accordance with both the temperature and the thermal mass characteristics of the material being heated.

Another object of my invention is to provide an automatic temperature control for surface heating units which is capable of anticipating the extent of overheating or underheating which may occur as a result of the thermal mass of the heat load, and to control the heating unit accordingly.

Another object of my invention is to provide a signal generating circuit for an automatic surface heating unit control arranged to produce a control signal which varies in magnitude and polarity in accordance with the heating time of the cooking load whereby the termination of each heating cycle is advanced or delayed so as to prevent both overheating and underheating of the cooking load.

Further objects and advantage of my invention will become apparent as the following description proceeds, and the features of novelty which characterize my invention will be pointed out with particularity in the claims annexed to and forming a part of this specification.

Briefly stated, in one embodiment of my invention I achieve the foregoing objectives by providing a heating control system in which the energization of the heating unit is controlled by a first circuit including a temperature detector element in thermal contact with the load being heated, and a second circuit arranged to generate a signal which is a function of the length of time the heating unit is energized. The second circuit, which may be referred to as an anticipator circuit, includes a pair of temperature sensitive elements of unequal thermal mass arranged to be equally heated each time the main heating unit is energized; thus during each heating cycle a varying differential between the resistances of these two elements occurs, and this differential is utilized as an anticipatory control to deenergize the heating unit either somewhat before (if the thermal mass of the load is low) or after (if the thermal mass of the load is high) the temperature detector element reaches the preselected temperature.

For a better understanding of my invention, reference may be made to the accompanying drawing in which Fig. 1 is a cross-sectional view of a surface heating unit including the temperature detector assembly of my invention.

Figure 1:
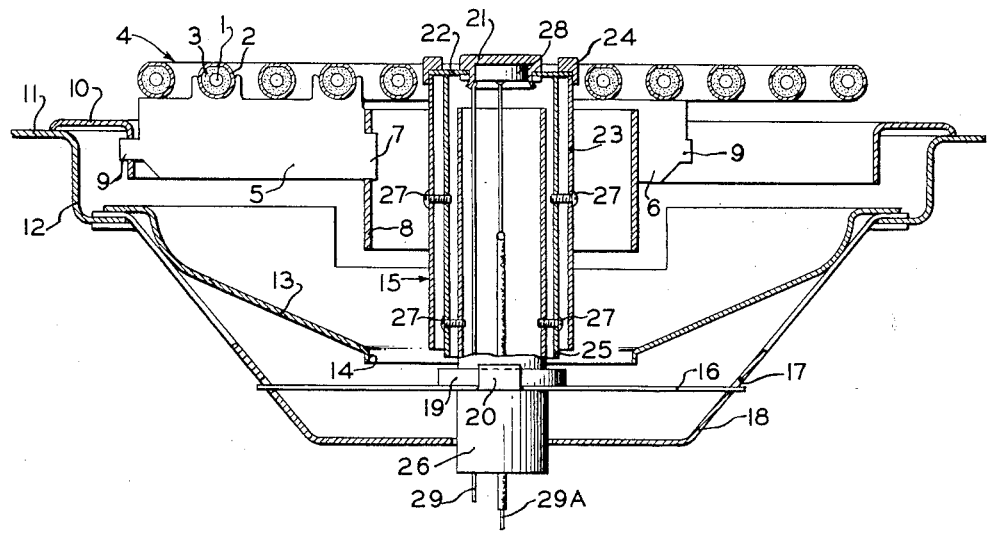
Figure 2:
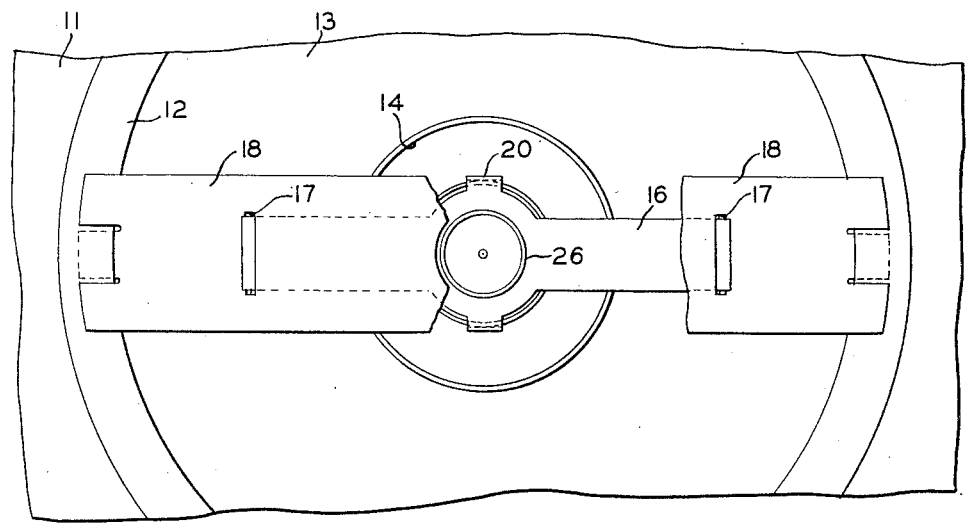
Fig. 2 is a bottom plan view of the unit shown in Fig. 1, some parts being cut away to show details of construction.

While the present invention is particularly adapted for use in conjunction with surface heating units of an electric range, I do not wish to be limited solely to this one application of my invention since the control arrangement disclosed and claimed herein may find many other applications in various types of heating devices and electric heating units. Referring to Figs. 1 and 2 of the drawing, I have shown an embodiment of my invention arranged to control an electric heating unit of the type commonly employed for the surface heaters of an electric range. Although the particular form of the heating element employed forms no part of the present invention, preferably it comprises a helical resistance conductor 1 mounted within an outer metallic sheath 2 and supported in spaced relation with reference to the outer sheath by an electrically insulating heat conducting mass 3 such as highly compressed granulated magnesium oxide. A complete heating element 4 is arranged in a spiral coil with the turns supported in spaced relation on a plurality of supporting arms such as arms 5 and 6. The innermost end of each of these supporting arms may include a projecting portion 7 arranged for rigid attachment to a cylindrical shell or heat barrier 8. The outer end of each of the supporting arms includes an ear 9 adapted to project through an aperture formed in a downwardly depending portion of an annular flanged member 10. Flanged member 10 in turn is adapted to rest on any suitable supporting surface 11, such as the cooking top of a range, so as to support the heating unit over a circular opening defined by flange 12, upon which a removable reflector or drip pan 13 having a central opening 14 is supported.

In order to control the heat output of heating element 4 in accordance with the temperature of the cooking load, it is of course necessary to provide some means for sensing that temperature, and I therefore provide a temperature detector assembly 15 mounted centrally within the heating unit and arranged to support a temperature sensitive element in contact with the bottom of a cooking utensil placed on the unit. To insure good thermal contact between the cooking utensil and the temperature sensitive element, temperature detector 15 is resiliently supported with respect to the heating unit so that its upper surface normally extends slightly above the upper surface of the heating element. In the present instance such a resilient mounting is achieved by the use of a flat spring 16, the two ends of which extend through slots 17 formed in strap-like member 18. The two ends of strap-like member 18 are clamped or otherwise secured to diametrically opposite portions of flange 12. The lower end of temperature detector 15, which is circular in cross-section, extends through aligned openings in reflector pan 13, flat spring 16 and strap-like member 18, being secured to spring 16 by means of collar 19 and its frictional engagement with upstanding ear portions 20.

Temperature detector assembly 15 comprises a metallic disk-shaped member 21 crimped or otherwise secured to a disk 22 of heat insulating material, such as mica, which in turn is secured at its periphery to the upper end of tubular shield 23 by means of clamping ring 24. Concentrically arranged within tubular shield 23 are additional shields 25 and 26, the three tubular shields being secured together by suitable means for minimizing heat transfer, such as screws 27.

From the description thus far it will be seen that disk-shaped member 21 is supported by temperature detector assembly 15 so as to be in good thermal contact with a cooking utensil placed on heating element 4 and further that it is shielded from heating element 4 so that its temperature substantially corresponds to that of the cooking utensil during a cooking operation. And since member 21 is formed from a metal which is highly conductive both thermally and electrically, such as copper or aluminum, it is apparent that temperature sensitive element 28, which is housed therein, will assume a temperature very close to the temperature of the cooking utensil.

Temperature sensitive element 28 is here shown as a cylinder supported within disk-shaped member 21 by soldering or similar means insuring good thermal and electrical contact. One of the primary requisites for element 28 is that its resistance must change greatly over the operating range of temperatures applicable. For example, in this particular application the range of temperatures desirable is from approximately 150° F. for warming operations to 400° F. for griddling operations. A thermally sensitive resistor the resistance of which changes from 500 ohms to 20 ohms over this temperature range provides a very satisfactory and reliable control employing the arrangement disclosed herein. It is also desirable, of course, that the assembled heat sensitive device be capable of withstanding the various mechanical shocks to which it is subjected during normal usage. In view of these various requirements, I find a thermistor particularly satisfactory for the thermally sensitive element 28 and hereafter element 28 will be referred to as a thermistor. By this term is meant any resistance element having a resistance which varies greatly with changes in temperature. Referring again to Fig. 1, the upper surface of thermistor 28, which in the present embodiment has a negative temperature coefficient of resistance, is in direct contact with disk-shaped member 21, and electrical connections are provided by lead 29 which is soldered to member 21 (which may be grounded to the frame of the range), and lead 29a which is soldered to the center of the under surface of the thermistor.

Figure 3:
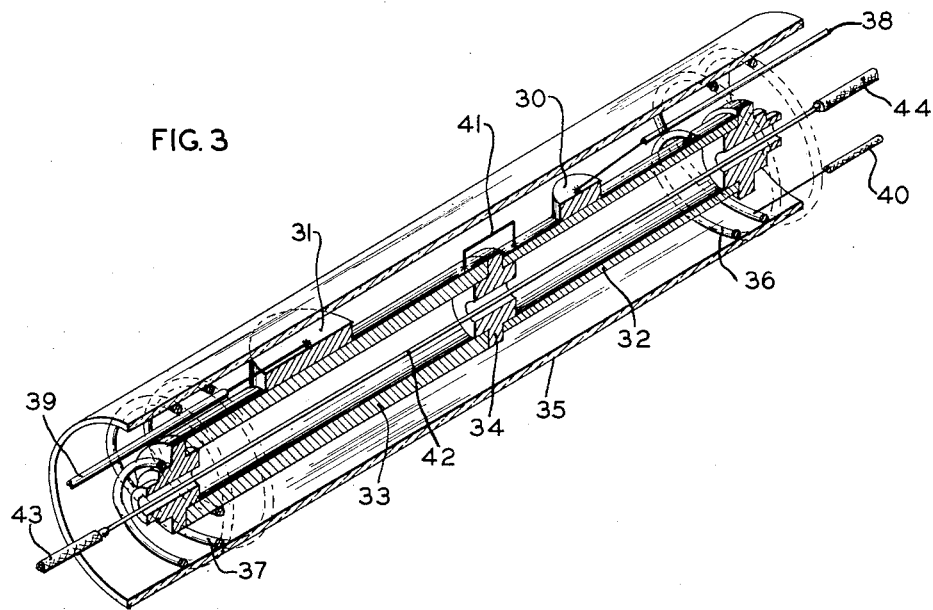
Fig. 3 is a view, partly in section, of the anticipator assembly which forms a part of my invention.

In Fig. 3 I have shown the anticipator assembly which forms a part of my invention and which is instrumental in controlling the heat output of heating unit 4 so as to prevent both overheating and underheating of the cooking load. The anticipator assembly includes thermistors 30 and 31 which have identical electrical resistance at any given temperature. However thermistor 31 has substantially more mass than thermistor 30, and therefore the resistance of thermistor 30 changes more rapidly than the resistance of thermistor 31 when both are subjected to the same change in ambient temperature. Thermistor 30 is mounted in heat transfer relation on a metallic tubular member 32 by suitable means such as soldering or brazing. Similarly, thermistor 31 is mounted on tubular member 33, it being noted that member 33 is substantially larger than member 32 so that the total mass of thermistor 31 and member 33 is substantially greater than the total mass of thermistor 30 and member 32. In a control system for a surface heating unit of the type herein disclosed, I have found that a mass ratio of the order of 8 to 1 gives good results, but other mass ratios may be more desirable in other applications. Members 32 and 33 are mechanically connected by insulating disk 34 and supported in a tube 25 of insulating material, such as ceramic or glass, by a pair of coil springs 36 and 37.

Referring to the electrical connections for thermistors 30 and 31, a lead 38 is soldered to the top surface of thermistor 30 and a lead 39 is similarly provided for thermistor 31. A lead 40 common to both thermistors is connected to spring 36 which in turn is electrically connected as by soldering to tubular member 32. A jumper lead 41 connecting tubular members 32 and 33 is provided to complete the electrical circuit to the bottom surface of thermistor 31, it being understood that both tubular members 32 and 33 are thermally and electrically conductive, being made of a metal such as brass or copper. The anticipator assembly is heated by an electrical resistance element such as resistance wire 42 mounted concentrically with respect to tubular members 32 and 33 and connected in series with heating element 4 by electrical leads 43 and 44; thus thermistors 30 and 31 are heated by the same heat source each time heating element 4 is energized.

Temperature detector 15 together with a manually adjustable rheostat and the anticipator assembly illustrated in Fig. 3 are electrically connected in a control system arranged to control the operation of a relay in the power circuit of heating element 4 in accordance with the respective currents flowing in the rheostat and thermistors 28, 30 and 31. In the embodiment of my control system herein disclosed I employ a magnetic amplifier of well known construction connected so as to operate in response to the aforementioned currents. Referring now to the diagrammatic view of my control system illustrated in Fig. 4, surface heating element 4 and anticipator heater 42 are arranged to be connected across power supply lines 45 and 46 through a manually operated switch 47 and means for regulating the supply of energy to the heating element such as hot wire relay 48. Contactor 49 of relay 48 is operated by the expansion or contraction of hot wire 50 connected to the load windings 51 and 52 of magnetic amplifier 53 by means of rectifiers 54 and 55. Thus when the power output of magnetic amplifier 53 increases to a predetermined value hot wire 50 is heated so as to expand sufficiently to open contactor 49, thus deenergizing heating elements 4 and 42. Transformer 56 is provided to supply power to the load windings 51 and 52 of magnetic amplifier 53 and also, by means of rectifying elements 57 and 58 and filter capacitor 59, to supply direct current for the control windings 60, 61, 62 and 63. Control winding 60 is connected in series with a manually adjustable resistor or rheostat 64 operated by control knob 65 which may be calibrated in terms of the various cooking operations or in degrees Fahrenheit so as to indicate the usual range of cooking temperatures. If desired, line switch 47 as well as rheostat 64 may be mechanically connected to knob 65 so as to provide a single knob control. Rheostat 64 is preferably constructed so as to be adjustable over a range of resistance values of substantially the same extent as the range of resistance changes occurring in temperature sensitive element 28. Control winding 61 is connected in series with thermistor 28 and thus the current flowing therein varies in accordance with the temperature of the cooking utensil. Similarly control winding 62 is connected in series with thermistor 30 and a fixed resistance 66 while control winding 63 is connected in series with thermistor 31, it being recalled that these thermistors are heated by anticipator assembly heater 42.

Thus it will be observed that rheostat 64 and thermistors 28, 30 and 31 are all connected in parallel in an electrical network arranged to control the power output of magnetic amplifier 53. As described in greater detail below, rheostat 64 and thermistor 28 cooperate to produce a temperature detector signal and may, therefore be referred to as being connected in opposite branches of a first parallel circuit, while thermistors 30 and 31 cooperate to produce an anticipator signal and may be referred to as forming opposite branches of a second parallel circuit.

The power output of magnetic amplifier 53 and hence the current flowing in hot wire 50 is of course dependent on the algebraic sum of the ampere turns in the four signal windings 60, 61, 62 and 63. Control windings 60 and 61 are so arranged that their currents oppose each other and when equal produce a net control current very nearly zero. Similarly control windings 62 and 63 have an equal number of turns and are connected in opposing relationship so that equal currents in them cancel each other. However windings 60 and 61 have a larger number of turns than windings 62 and 63, the turn ratio being of the order of 5 to 3 for example. Thus if the current differential between windings 60 and 61 is assumed to be one milliampere a current differential of 1.66 milliamperes of opposite polarity in windings 62 and 63 would produce a net control current of zero. The four control windings are so connected and arranged that an increase in current in either winding 60 or 63 tends to decrease the power output of the amplifier (and thus tends to cause contactor 49 to close) while an increase in current in either winding 61 or 62 tends to increase the power output (thus tending to open contactor 49).

It should now be apparent that heating element 4 is initially energized by closing line switch 47 and rotating control knob 65 clockwise so as to reduce the resistance of rheostat 64 below that of thermistor 28, thus establishing a net control current in magnetic amplifier 53 such that its power output is insufficient to open relay 48. Neglecting the effect of windings 62 and 63 for the moment, relay 48 will remain closed and heating element 4 energized until thermistor 28 has been heated (by the cooking utensil) to the preselected temperature, at which time the current in control winding 61 will have increased to a value sufficient to cancel the current in winding 60, thus increasing the power output of the amplifier and opening relay 48. Under these conditions I have found that serious overheating may occur when a light cooking load such as one cup of water is heated by heating element 4. The three factors involved in such overheating are first, initially the temperature of the thermistor in contact with the cooking utensil lags behind the temperature of the utensil; second, because of the relatively high thermal mass of the heating element it continues to deliver heat to the utensil after the until has been deenergized; and third, the conductivity of the utensil may be such that it conducts heat from the heating element to the cooking load more rapidly than it conducts heat from the cooking load to the thermistor.

Conversely, when a large cooking load is heated the heating unit may be deenergized before the load reaches the preselected temperature. Two factors are responsible for this: first, the temperature of the thermistor may be increased above that of the cooking utensil by heat radiated directly from the heating element because the heat insulating shields may not be completely effective over a relatively long heating period; and second, over a relatively long heating period the thermistor temperature is raised by heat shunted from the heating element through the bottom of the utensil, or in other words the temperature of the utensil may be substantially above that of the cooking load (this effect is of course present in the case of the small load but it is more than counterbalanced by the first of the three factors relating to overheating).

Figure 5:
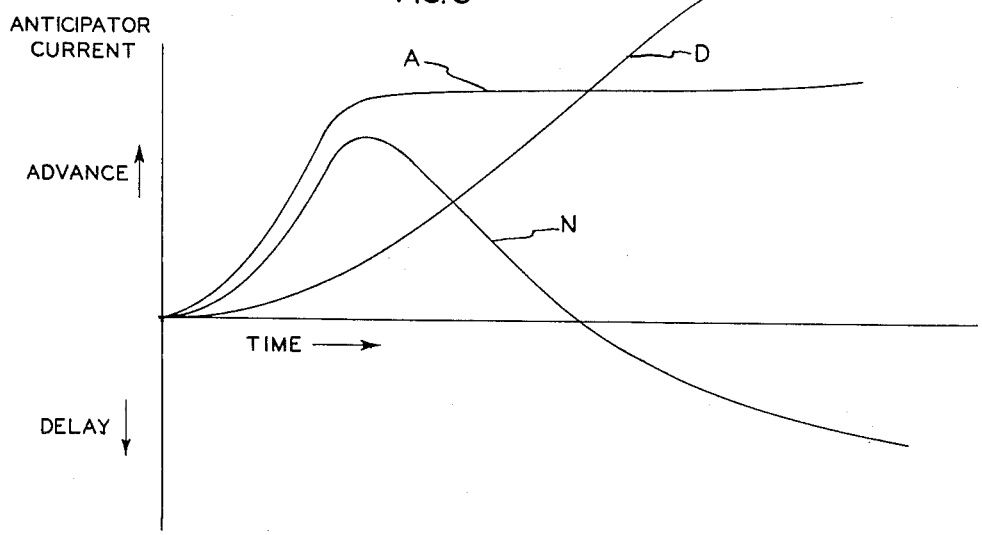
Fig. 5 is a graphical representation of the current versus time characteristics of my anticipator circuit.

To minimize both the underheating and overheating referred to above I have provided an anticipator circuit which includes thermistors 30 and 31, resistor 66 and control windings 62 and 63. The circuit is arranged to generate a signal which, during an initial heating cycle, is a function of the time required to raise the temperature of thermistor 28 to the pre-selected temperature. In Fig. 5 I have illustrated the manner in which the currents in windings 62 and 63 vary during a heating cycle. Curve A represents the current flowing in the branch of my anticipator circuit which includes thermistor 30, resistor 66 and control winding 62, it being remembered that thermistor 30 is of relatively low mass as compared with thermistor 31 and that it is heated relatively rapidly when heater 42 is energized. As pointed out above, an increase in current in winding 62 tends to cause relay 48 to open and thus advance the deenergization of heating element 4. Curve D represents the current flowing in the branch of my anticipator circuit which includes thermistor 31 and control winding 63; it will be observed that this current increases at a much lower rate than the current in winding 62, but that it eventually reaches a substantially higher value. The lower maximum current in winding 62 is of course caused by fixed resistor 66 which limits the current in this branch of the circuit to a value substantially less than the maximum current in winding 63. Curve N represents the algebraic sum of currents A and D, and as explained above it is this net signal current which modifies the effect of the control current differential between the currents flowing in windings 60 and 61. It will be observed that the net anticipator signal first increases to a maximum and then if heater 42 remains energized it decreases to zero. Continued energization of heater 42 (as in the case of a heavy cooking load of high thermal mass) causes the delay current (curve D) to exceed the advance current (curve A), and thus the net anticipator signal changes polarity and increases to a maximum delay value dependent on the resistance of resistor 66. Thus my anticipator circuit generates a net anticipator signal which first aids the current in the temperature detector circuit and after a fixed period of time opposes it.

Figure 4:
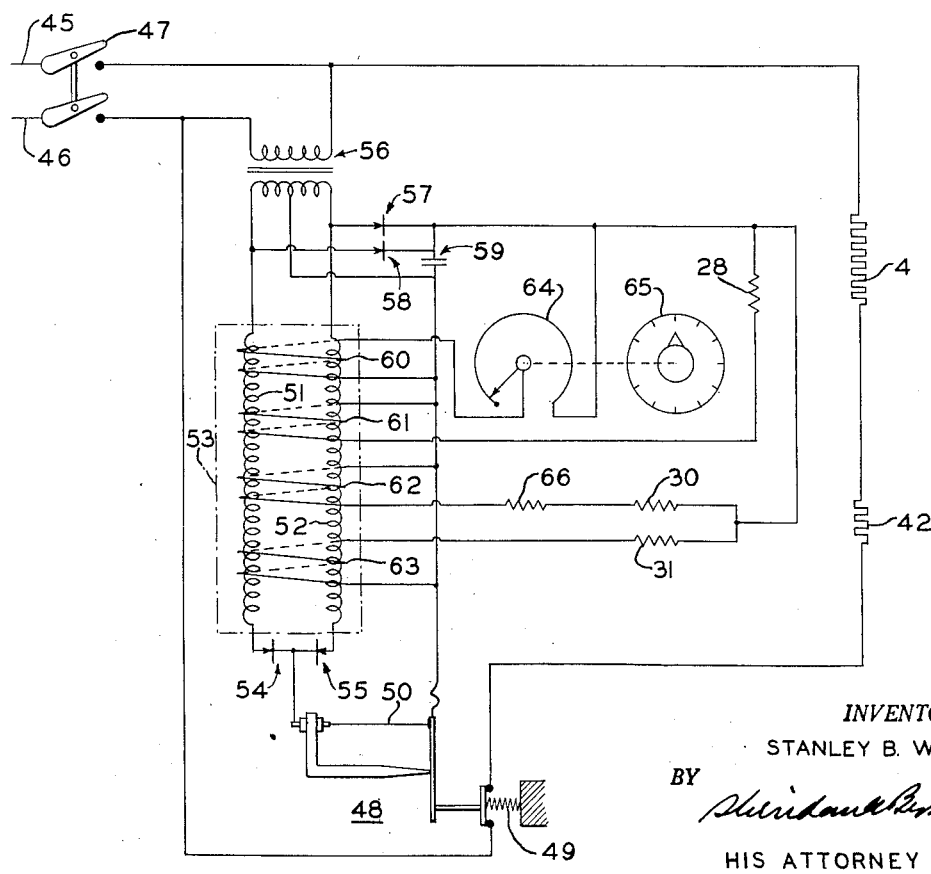
Fig. 4 is a diagrammatic view of the various components and electrical connections of my automatic control system.

In describing the operation of the embodiment of my control system illustrated in Fig. 4 is will first be assumed that a cooking vessel containing a relatively small quantity of food has been placed on surface heating element 4, that switch 47 has been closed, and that control knob 65 has been rotated to a position corresponding to the desired cooking temperature. As control knob 65 is rotated clockwise to the desired position the resistance of rheostat 64 is decreased thus increasing the current in control winding 60. At this point thermistor 28 is at room temperature and consequently only a very small current flows in control winding 61; also because thermistors 30 and 31 are likewise at room temperature insufficient current flows in windings 62 and 63 to appreciably affect the operation of magnetic amplifier 53. Thus normally closed relay 48 remains closed because the current in control winding 60 limits the current in load windings 51 and 52 to a value below the current required to operate the relay. Consequently heating element 4 and also heater 42 are energized and the heating of the cooking load is begun. As the temperature of the cooking utensil and its contents increases, thermistor 28 likewise increases in temperature, causing an increase in the current flowing in winding 61. Inasmuch as the resistance of rheostat 64 remains constant, the current differential between windings 60 and 61 decreases, thus causing an increase in the power output of magnetic amplifier 53 which in turn causes hot wire 50 to expand.

At the same time the temperatures of thermistors 30 and 31 increase as a result of the heat received from heater 42, and thus the power output of magnetic amplifier 53 is further increased by the resulting net anticipator signal supplied by windings 62 and 63. Consequently the power output of magnetic amplifier 53 reaches a level sufficient to open relay 48 somewhat before the currents in windings 60 and 61 balance each other indicating that the cooking load has reached the desired temperature. As indicated in Fig. 5, if the load is very light and requires only a short heating period to reach the desired temperature the net anticipator signal will be near its maximum in the advance range when the rapidly rising current in winding 61 approaches the value of the current in winding 60. Consequently heating element 4 (and heater 42) will be deenergized considerably before thermistor 28 reaches the desired temperature. However, because the cooking utensil continues to receive heat from heating element 4 after it is deenergized and also because it is actually hotter than thermistor 28 the load reaches the preselected temperature and after a short interval begins to cool. From this point on little power is required to maintain the preselected temperature and as a result heater 42 and thermistors 30 and 31 cool and remain comparatively cool so that the currents in windings 62 and 63 become almost equal and the effect of the anticipator is minimized. However because of the low mass of thermistor 30, during each cycle the opening of relay 48 is somewhat advanced, thus minimizing the temperature differential in the cooking load.

To further illustrate the operation of my control system it will now be assumed that a utensil containing a relatively large quantity of food to be cooked has been placed on heating element 4 and that switch 47 and control knob 65 are set to start the cooking operation. Again relay 48, which is closed at room temperature, remains closed because the current differential in windings 60 and 61 limits the current in load windings 51 and 52 of amplifier 53. Because of the relatively high thermal mass of the cooking load, its temperature rises at a relatively low rate as compared with the temperature increase of the light load referred to above, and hence the power output of amplifier 53 remains low for a longer period during the heating cycle. Consequently although the net anticipator signal generated in the anticipator circuit during this period tends to increase the power output of the amplifier, it is insufficient to increase the power output to the value required to open relay 48. As the heating of the utensil continues and thermistor 28 begins to approach the preselected temperature, the net anticipator signal tending to advance the opening of the relay decreases to zero and changes to a delaying signal which increases in value as shown in Fig. 5. In other words, as the heating of thermistors 30 and 31 continues, the difference between their resistances decreases to virtually zero and hence the current in windings 63 exceeds that in winding 62 because of the limiting effect of resistor 66. Thus even though thermistor 28 reaches the preselected temperature, relay 48 remains closed and heating element 4 remains energized until the temperature of thermistor 28 rises to a value sufficient to cause the current differential of windings 60 and 61 to overcome the delaying anticipator signal and open relay 48. After the initial heating cycle has raised the temperature of the cooking load to the preselected temperature, it is maintained by succeeding heating cycles, the duration of which is somewhat decreased by the anticipator signal, thus minimizing the temperature differential in the cooking load.

Figure 6:
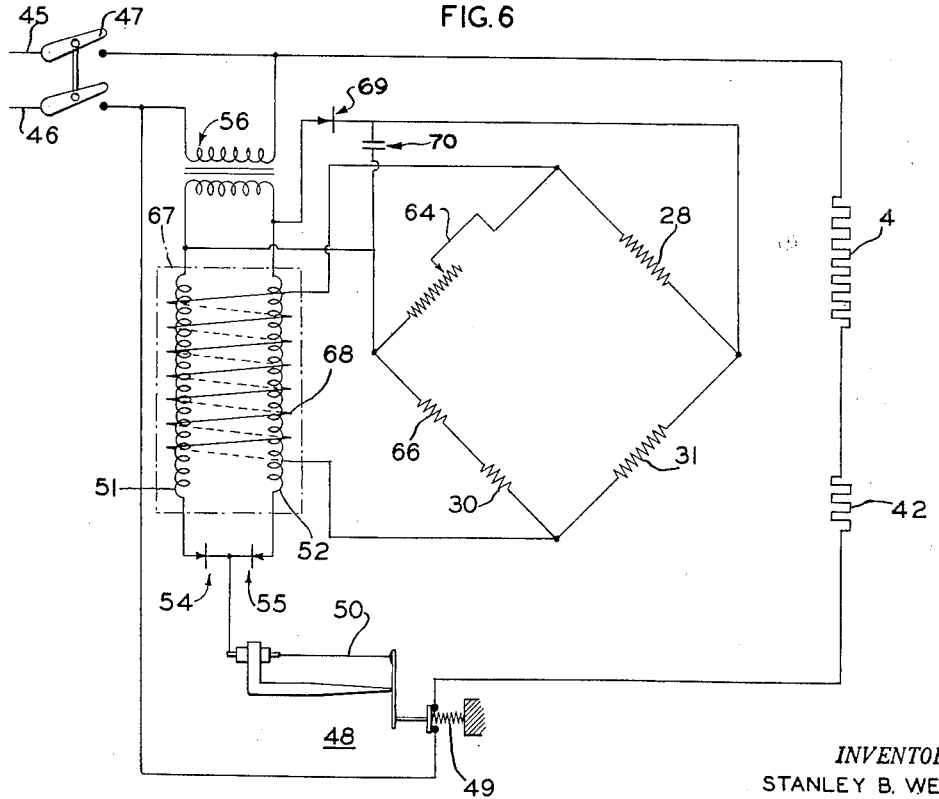
Fig. 6 is a diagramatic view of another embodiment of my invention.

In Fig. 6 of the drawing I have shown a modified form of my invention in which a Wheatstone bridge type circuit is utilized. Many of the elements are identical with those in the previously described embodiment and so for convenience I have utilized the same number symbols to designate the same components. It should also be understood that the physical arrangement and location of parts in this embodiment are the same as that illustrated in Figs. 1, 2 and 3.

Referring to Fig. 6, a magnetic amplifier 67 having a single control winding 68 is employed to supply power to hot wire relay 48 in accordance with variations in the resistances of thermistors 28, 30 and 31. These thermistors together with rheostat 64 are connected in a Wheatstone type bridge circuit having input terminals connected through rectifier 69 and filter capacitor 70 to the transformer 56 and output terminals connected to control winding 68. Thermistor 28, which is of course responsive to the temperature of the cooking utensil heated by heating unit 4, and rheostat 64 form a first pair of adjacent branches of the bridge circuit while anticipator thermistors 30 and 31 (together with fixed resistor 66 in series with thermistor 30) form the second pair of adjacent branches. Thus it will be seen that the bridge is balanced and that no current flows in control winding 68 when the resistance ratios of thermistor 30 plus resistor 66 and thermistor 31 equals the resistance ratio of rheostat 64 and thermistor 28. When this condition exists and also whenever the first mentioned ratio exceeds the latter, the power output of magnetic amplifier 67 is insufficient to open relay 48 and consequently current is supplied to heating unit 4, assuming line switch 47 has been closed. In other words the power output of amplifier 67 will increase sufficiently to open relay 48 only when the ratio of the resistance of thermistor 28 to the resistance of rheostat 64 is less than the ratio of the resistance of thermistor 31 to the combined resistance of thermistor 30 and fixed resistor 66. In considering the operation of the embodiment of my control system illustrated in Fig. 6 it is apparent that during any cooking operation the resistances of thermistors 28, 30 and 31 vary in the manner described above in connection with the operation of the embodiment shown in Fig. 4. Thus when a cooking operation is started by closing line switch 47 and adjusting rheostat 64 to the desired temperature setting, the resistance of thermistor 28 exceeds that of rheostat 64 while the resistance of thermistor 31 is slightly less than the resistance of thermistor 30 and fixed resistor 66. As the heating cycle continues and thermistors 30 and 31 are heated by heater 42 the resistance of thermistor 30 decreases at a relatively rapid rate because of its lower thermal mass, and hence the anticipator ratio (i. e., the ratio of the resistances of thermistor 31 to thermistor 30 plus resistor 66) increases to a peak value, then decreases as heating continues and finally reaches a value lower than its initial value. At the same time, the ratio of the resistances of thermistors 28 and rheostat 64 is decreasing and when this temperature detector ratio becomes less than the anticipator ratio relay 48 is energized and the heating circuit is opened by contactor 49. Thus if a relatively light cooking load is being heated by heating element 4 the rising anticipator ratio will exceed the decreasing temperature detector ratio before the utensil actually reaches the preselected temperature and hence heating element 4 will be deenergized somewhat before thermistor 28 reaches the preselected temperature. On the other hand if a relatively heavy cooking load is being heated by heating element 4 the temperature detector ratio decreases at a relatively slow rate and does not drop below the anticipator ratio until the temperature of thermistor 28 is somewhat higher than the preselected temperature, because the anticipator ratio has also decreased to a value lower than its initial value. Thus the opening of relay 48 is delayed until some time after thermistor 28 indicates that the preselected temperature has been reached.

From the foregoing description it will be seen that the embodiments of my control system illustrated in Figs. 4 and 6 produce the same results and function in the same manner except that in the embodiment of Fig. 6 the thermistors and temperature control rheostat are connected so as to control a single winding 68 rather than the four separate control windings 60, 61, 62 and 63 shown in Fig. 4. While the present embodiments of my control system are arranged to utilize thermistors having a negative temperature coefficient of resistance, it is apparent that the system could be arranged to operate in response to changes in resistance of thermistors having a positive temperature coefficient of resistance.

From the above disclosure it may be seen that I have provided an improved automatic temperature control which not only maintains a cooking vessel at a uniform preselected temperature, but which also controls the initial heating cycle so as to prevent both overshooting of this temperature and time consuming delays caused by failure to reach the preselected temperature on the first cycle of operation. It further may be seen that the temperature detector assembly which is subjected to the intense heat of the heating unit involves no moving parts which might become inoperative due to such temperatures or from fouling by food substances during cooking. All other components of my control system including the anticipator assembly, the magnetic amplifier, the hot wire relay and the control knob and rheostat may be, and preferably are, located at remote points within the range or elsewhere where they may be adequately protected from heat and foreign substances to insure their reliability and long operating life.

A further advantage of the preferred embodiment of my invention resides in the provision of a separate relatively low mass heating element for the anticipator thermistors and the location of the anticipator assembly remotely with respect to the surface heating unit. With this arrangement the anticipator thermistors cool relatively rapidly during the periods when the surface heating unit is deenergized and function so as to shorten each heating cycle during cooking operations, thus minimizing the temperature differential in the cooking load.

While I have shown and described two specific embodiments of my invention, I do not desire my invention to be limited to the particular constructions shown and described, and I intend by the appended claims to cover all modifications within the true spirit and scope of my invention.

What I claim as new and desire to secure by Letters Patent of the United States is:

1. An automatic temperature control system for a heating unit comprising a first thermistor arranged to be in thermal contact with the material heated by said heating unit, second and third thermistors in thermal contact with a heat source heated simultaneously with said heating unit, said second and third thermistors having substantially equal temperature coefficients of resistance and being constructed and arranged in relation to said heat source so that the rate of change of the resistance of said second thermistor is substantially higher than the rate of change of the resistance of said third thermistor when both are heated by said heat source, means associated with said second thermistor for limiting the maximum current therein to a value less than the maximum current in said third thermistor, means for regulating the supply of energy to said heating unit, and electric circuit means responsive to changes in the resistance of said first thermistor and to changes in the difference between the total resistance of said second thermistor and said resistor and the resistance of said third thermistor for controlling said regulating means.

2. An automatic temperature control system for a heating unit comprising a manually variable resistor for setting the desired temperature, a first thermistor arranged to be in thermal contact with the material heated by said heating unit, second and third thermistors in thermal contact with a heat source heated simultaneously with said heating unit, said second and third thermistors having substantially equal temperature coefficients of resistance and being constructed and arranged in relation to said heat source so that the rate of change of the resistance of said second thermistor is substantially higher than the rate of change of the resistance of said third thermistor when both are heated by said heat source, means associated with said second thermistor for limiting the maximum current therein to a value less than the maximum current in said third thermistor, means for regulating the supply of energy to said heating unit, and electric circuit means responsive to the difference in resistance between said variable resistor and said first thermistor and to changes in the difference between the total resistance of said second thermistor and said fixed resistor and the resistance of said third thermistor for controlling said regulating means.

3. An automatic temperature control system for an electric surface heating unit comprising a manually variable resistor for setting the desired cooking temperature, a first thermistor arranged to receive heat from a cooking utensil placed on said heating unit, a heating element connected in circuit with said heating unit so as to be energized simultaneously therewith, second and third thermistors supported in heat transfer relation with said heating element, said second and third thermistors having substantially equal temperature coefficients of resistance and said heating element being remotely located with respect to said heating unit, said second and third thermistors being constructed and arranged in relation to said heating element so that the rate of change of the resistance of said second thermistor is substantially higher than the rate of change of said third thermistor when both are heated by said heating element, a current limiting resistor in series circuit relation with said second thermistor, means for regulating the flow of current to said heating unit, and electric circuit means responsive to the difference in resistance between said variable resistor and said first thermistor and to changes in the difference between the total resistance of said second thermistor and said fixed resistor and the resistance of said third thermistor for controlling said current regulating means.

4. An automatic temperature control system comprising a heating unit, means for regulating the supply of energy to said heating unit, a first thermistor responsive to the temperature of the material heated by said heating unit, second and third thermistors in heat transfer relation with a heat source arranged to be heated simultaneously with said heating unit, said second and third thermistors being constructed and arranged in relation to said heat source so that the rate of change of the resistance of said second thermistor is substantially higher than the rate of change of the resistance of said third thermistor when both are heated by said heat source, an electrical control network including said first, second and third thermistors, means in said network for limiting the maximum current in said second thermistor to a value less than the maximum current in said third thermistor, and means responsive to the currents flowing in said network for controlling said energy regulating means.

5. An automatic temperature control system comprising a heating unit, means for regulating the supply energy to said heating unit, a first thermistor responsive to the temperature of the material heated by said heating unit, second and third thermistors in heat transfer relation with a heat source arranged to be heated simultaneously with said heating unit, said second and third thermistors being constructed and arranged in relation to said heat source so that the rate of change of the resistance of said second thermistor is substantially higher than the rate of change of the resistance of said third thermistor when both are heated by said heat source, a first parallel circuit including said first thermistor in one branch thereof, a second parallel circuit including said second and third thermistors in opposite branches, means in said second parallel circuit for limiting the maximum current in said second thermistor, and means responsive to the currents flowing in said parallel circuits for controlling said energy regulating means.

6. A control system for a surface heating unit adapted to supply heat to a cooking utensil supported thereon comprising electrical power supply means, means including an element responsive to utensil temperature and a manually adjustable temperature control member for generating a temperature signal proportional to the difference between a pre-set cooking temperature and the temperature of the utensil, means for regulating the heat output of said heating unit in response to said temperature signal, and means for modifying the operation of said regulating means in accordance with the thermal mass of said utensil and its contents, said last mentioned means comprising a pair of thermistors of unequal thermal mass connected in opposite branches of a parallel circuit including a fixed resistor in series with the thermistor of lesser thermal mass, heater for said thermistors arranged to be energized simultaneously with said heating unit, and means for applying an anticipator signal proportional to the current differential of said pair of thermistors to said regulating means whereby said regulating means is operated in accordance with the algebraic sum of said temperature signal and said anticipator signal.

7. An automatic temperature control for an electric surface heating unit comprising electrically actuated means for regulating the supply of energy to said heating unit, a first thermistor arranged to receive heat from a cooking utensil placed on said heating unit, a manually variable resistance element for setting the desired cooking temperature, a heating element connected in circuit with said electrically actuated means and arranged to be energized simultaneously with said heating unit, second and third thermistors supported in heat transfer relation with said heating element, said second and third thermistors and said heating element being remotely located with respect to said heating unit, said second and third thermistors being constructed and arranged in relation to said heating element so that the rate of change of the resistance of said second thermistor is substantially higher than the rate of change of the resistance of said third thermistor when both are heated by said heating element, a first control circuit in which said first thermistor and said variable resistance element are connected and in which the difference between their resistances forms a variable element, a second control circuit in which said second and third thermistors are connected and in which the difference between their resistances forms a variable element, means in said second control circuit for limiting the maximum current in said second thermistor to a value less than the maximum current in said third thermistor, and means responsive to the combined current differentials in each of said control circuits for controlling said electrically actuated energy regulating means.

8. A control system for a heating unit including an electrical resistance element adapted to supply heat to a cooking utensil, an energizing circuit for said resistance element, and current responsive means in said energizing circuit for controlling the supply of energy to said resistance element, said system comprising a thermistor responsive to the temperature of the cooking utensil and a variable resistor connected in parallel in a first control circuit, a pair of thermistors of unequal thermal mass connected in parallel in a second control circuit, means in said second control circuit for limiting the maximum current flow through the thermistor of relatively low thermal mass to a value less than the maximum current flow through the thermistor of relatively high thermal mass, means for heating said pair of thermistors simultaneously with the energization of said resistance element, and means connected in circuit with said current responsive means for combining and amplifying the signal currents in said first and second control circuits whereby the supply of energy to said resistance element is controlled in accordance with the temperature and thermal mass of said utensil and its contents.

9. A control system for an electrical surface heating unit adapted to supply heat to a cooking utensil supported thereon comprising an energizing circuit for said heating unit, a current responsive relay in said circuit for controlling the supply of energy to said heating unit, a magnetic amplifier having four control windings, the operation of said relay being controlled by the output current of said amplifier, means for supplying power to said amplifier, a variable resistor for setting the desired cooking temperature, a thermistor disposed centrally of said heating unit and supported so as to be in heat transfer relation with a utensil supported thereon, said variable resistor and said thermistor being connected in a first control circuit with two of said control windings and a pair of thermistors of unequal thermal mass mounted in heat transfer relation with an electric heater, said heater being connected with said relay so as to be energized simultaneously with said heating unit, said pair of thermistors together with a resistor in series with the thermistor of relatively lower thermal mass being connected in a second control circuit with the remaining two of said control windings, whereby said second control circuit produces a control signal of a magnitude and polarity such that the initial heating cycle of said heating unit is extended or shortened in accordance with the thermal mass of said utensil and its contents.

10. A control system for an electrical surface heating unit adapted to supply heat to a cooking utensil supported thereon comprising an energizing circuit for said heating unit, a current responsive relay in said circuit for controlling the supply of energy to said heating unit, a magnetic amplifier having a first pair of control windings connected in opposing relationship and a second pair of control windings connected in opposing relationship, means for supplying power to both the control windings and the load windings of said amplifier, the operation of said relay being controlled by the output current of said amplifier, a manually operated rheostat for setting the desired cooking temperature, a thermistor disposed centrally of said heating unit and supported so as to be in heat transfer relation with said utensil, said rheostat and said thermistor being connected with said first pair of control windings to form a temperature control circuit in which the current differential between said first pair of windings is proportional to the difference between the desired temperature and the temperature of said thermistor, and a pair of thermistors of unequal thermal mass mounted in heat transfer relation with an electric heater, said heater being connected in series with said heating unit so as to be energized simultaneously therewith, said pair of thermistors together with a fixed resistor in series with the thermistor of relatively lower thermal mass being connected with said second pair of control windings to form an anticipator control circuit in which the current differential between said second pair of control windings varies in both magnitude and polarity in accordance with the temperature differential between said pair of thermistors, whereby the initial heating cycle of said heating unit is extended or shortened in accordance with the thermal mass of said utensil and its contents.

11. An automatic temperature control system comprising a heating unit, a first thermistor responsive to the temperature of the material heated by said heating unit, second and third thermistors in heat transfer relation with a heat source arranged to be heated simultaneously with said heating unit, said second and third thermistors being constructed and arranged in relation to said heat source so that the rate of change of the resistance of said second thermistor is substantially higher than the rate of change of the resistance of said third thermistor when both are heated by said heat source, a bridge circuit of the Wheatstone type having input and output terminals and including said thermistors in separate branches thereof, a fixed resistor in the branch of said bridge circuit in which said second thermistor is connected and means responsive to the output of said bridge circuit for controlling the supply of energy to said heating unit.

12. An automatic temperature control for an electric surface heating unit comprising electrically actuated means for regulating the supply of energy to said heating unit, a first thermistor arranged to receive heat from a cooking utensil placed on said heating unit, a manually variable resistor for setting the desired cooking temperature, a heating element connected in circuit with said electrically actuated means and arranged to be energized simultaneously with said heating unit, second and third thermistors supported in heat transfer relation with said heating unit, said second and third thermistors and said heating element being remotely located with respect to said heating unit, said second and third thermistors being constructed and arranged in relation to said heating element so that the rate of change of the resistance of said second thermistor is substantially higher than the rate of change of the resistance of said third thermistor when both are heated by said heating element, a bridge circuit including a pair of input terminals, a pair of output terminals, and said thermistors and variable resistor forming separate branches thereof, means in said bridge circuit for limiting the maximum current in said second thermistor to a value less than the maximum current in said third thermistor, and means responsive to the output of said bridge circuit for controlling said electrically actuated energy regulating means.

13. A control system for an electrical surface heating unit adapted to supply heat to a cooking vessel supported thereon comprising an energizing circuit for said heating unit, a current responsive relay in said circuit for controlling the supply of energy to said heating unit, a magnetic amplifier, connected to said relay so as to supply current thereto, a variable resistor for setting the desired cooking temperature, a thermistor disposed centrally of said heating unit and supported so as to be in heat transfer relation with a utensil supported thereon, said variable resistor and said thermistor being electrically connected to form a first pair of adjacent branches of a bridge circuit of the Wheatstone type, a pair of thermistors of unequal thermal mass electrically connected to form the second pair of adjacent branches of said bridge circuit, an electric heater mounted in heat transfer relation with said pair of thermistors and connected with said relay so as to be energized simultaneously with said heating unit, and electrical connections between the control winding of said amplifier and the output terminals of said bridge circuit.

14. A control system for an electrical surface heating unit adapted to supply heat to a cooking utensil supported thereon comprising an energizing circuit for said heating unit, a current responsive relay in said circuit for controlling the supply of energy to said heating unit, a magnetic amplifier having a single control winding, means for supplying power to both the control winding and the load windings of said amplifier, the operation of said relay being controlled by the output current of said amplifier, a manually operated rheostat for setting the desired cooking temperature, a thermistor disposed centrally in said heating unit and supported so as to be in heat transfer relation with said utensil, second and third thermistors remotely located with respect to said heating unit and mounted in heat transfer relation with an electric heater connected in series with said heating unit so as to be energized simultaneously therewith, the thermal mass of said second thermistor being substantially less than the thermal mass of said third thermistor, a fixed resistor in series with said second thermistor, a bridge circuit comprising first and second input terminals and first and second output terminals, said variable resistor being connected between said first input terminal and said first output terminal, said first thermistor being connected between said first output terminal and said second input terminal, said second thermistor and said fixed resistor being connected between said first input terminal and said second output terminal, said third thermistor being connected between said second input terminal and said second output terminal, and electrical connections between said output terminals and said control winding of said amplifier.

15. An automatic control system for a heating unit comprising temperature responsive means for producing a signal proportional to the temperature of the object being heated including a temperature detector in heat transfer relation with said object, control means for energizing and de-energizing said heating unit in accordance with said temperature signal, and electrical means connected in circuit with said control means and energized concurrently with said heating unit for producing an anticipator signal which advances or delays the energization of said heating unit in accordance with the thermal mass of said object, said anticipator signal varying in a predetermined manner during initial energization of said heating unit from a maximum value of a polarity such that it causes de-energization of the heating unit before said detector reaches the desired temperature to zero and finally to a value of opposite polarity if the energization cycle continues for a predetermined interval of time, said electrical means including a pair of thermistors in thermal contact with a heat source heated simultaneously with said heating unit, said thermistors being constructed and arranged in relation to said heat source so that the rate of change of the resistance of one of said thermistors is substantially higher than the rate of change of the resistance of the other of said thermistors when both are heated by said heat source, whereby said control means is influenced by said anticipator signal so as to de-energize said heating unit before said detector reaches the desired temperature if the thermal mass of the object is relatively low and to de-energize the heating unit after said detector reaches the desired temperature if the thermal mass of the object is relatively high.

References Cited in the file of this patent

UNITED STATES PATENTS

| | | |
|---|---|---|
| 1,979,311 | Borden | Nov. 6, 1934 |
| 2,148,491 | Moore | Feb. 28, 1939 |
| 2,218,502 | Breitenstein | Oct. 22, 1940 |
| 2,236,624 | Littwin | Apr. 1, 1941 |
| 2,261,343 | De Florez | Nov. 4, 1941 |
| 2,429,827 | Lamm | Oct. 28, 1947 |
| 2,488,580 | Burleigh | Nov. 22, 1949 |
| 2,496,860 | Davis | Feb. 7, 1950 |
| 2,602,132 | Young | July 1, 1952 |
| 2,709,216 | Moran et al. | May 24, 1955 |